United States Patent [19]

Krieg et al.

[11] Patent Number: 5,028,163
[45] Date of Patent: Jul. 2, 1991

[54] ELASTIC BEARING

[75] Inventors: Michael Krieg, Meerbusch; Fritz Busse, Hilden, both of Fed. Rep. of Germany

[73] Assignee: TRW Ehrenreich GmbH & Co. KG, Fed. Rep. of Germany

[21] Appl. No.: 414,912

[22] Filed: Sep. 29, 1989

[30] Foreign Application Priority Data

Oct. 1, 1988 [DE] Fed. Rep. of Germany ....... 3833409

[51] Int. Cl.$^5$ ............................................ F16C 11/00
[52] U.S. Cl. ................................. 403/131; 403/132; 403/165
[58] Field of Search .............. 403/132, 133, 131, 165, 403/127, 128, 74

[56] References Cited

U.S. PATENT DOCUMENTS

| 2,846,251 | 8/1958 | Herbenar . | |
|---|---|---|---|
| 2,859,033 | 11/1958 | Rose . | |
| 3,194,614 | 7/1965 | Thomas . | |
| 3,408,124 | 10/1968 | Melton et al. | 403/131 X |
| 3,667,789 | 6/1972 | McNeely et al. | 403/128 |

FOREIGN PATENT DOCUMENTS

| 3004075 | 8/1981 | Fed. Rep. of Germany . | |
|---|---|---|---|
| 3032788 | 4/1982 | Fed. Rep. of Germany . | |
| 3613123 | 10/1987 | Fed. Rep. of Germany . | |
| 1263246 | 5/1961 | France . | |
| 501748 | 3/1939 | United Kingdom | 403/133 |
| 1360515 | 7/1974 | United Kingdom . | |

*Primary Examiner*—Andrew V. Kundrat
*Attorney, Agent, or Firm*—Tarolli, Sundheim & Covell

[57] ABSTRACT

An elastic bearing for steering rods of motor vehicles with a stud (1) which is rotatable and which is movable with limited angular and radial mobility. The stud (1) is pressed with interposition of an elastomer bushing (2) into an intermediate shell (3) to permit limited angular and radial mobility of the stud. The intermediate shell (3) is rotatably supported in a joint housing (9), is simpler to produce, and has close moment of rotation tolerances even during operation. For this purpose, the intermediate shell (3) has on the outside a collar (4). Two bearing shells (7, 8) are set between the intermediate shell (3) and the joint housing (9) and are supported against the collar. The bearing shells (7, 8) are pressed by a spring element (10) supported on the joint housing (9) in the axial direction of the stud against the collar (4).

13 Claims, 2 Drawing Sheets

ELASTIC BEARING

BACKGROUND OF THE INVENTION

1. Technical Field

The invention relates to an elastic bearing for steering rods of motor vehicles with a stud which is rotatable and movable angularly and radially. The stud is pressed into an intermediate shell and an elastomer bushing is interposed between the shell and the stud which permits limited angular and radial movement of the stud. The intermediate shell is rotatably supported in a joint housing.

The invention also relates to an elastic bearing for steering rods of motor vehicles with a stud which is rotatable in an intermediate shell. The intermediate shell is pressed into a joint housing and an elastomer bushing is interposed between the shell and the joint housing permitting limited angular and radial relative movement.

2. Background Art

Elastic bearings of the kind described above are needed, in particular, for support of the middle rod of three-part steering rods for motor vehicles, in which a rotation of the stud even with slight moment of rotation, and a damping of vibrations, must be possible.

From German Disclosure 30 04 75 is known an elastic bearing with a cylindrical stud, which is held in a rubber-elastic body, while clamping rings lying against a ring of the body hold and prestress the latter in a joint housing. The moment of rotation of the stud is especially great, however, because the rubber-elastic body has a high frictional adhesion to the inner wall of the housing. Moreover, in this known bearing, both the moment of rotation of the stud and the elasticity of its angular and radial movement are determined by the prestress of the clamping rings, so that these parameters of operation cannot be set independently of each other.

German Disclosure 3,613,123 discloses an elastic bearing of the kind, in which the stud can be moved unhindered in the axial direction of the stud because rotary slide bearings are arranged between an intermediate shell and a joint housing or between an intermediate shell and the stud. Since each rotary slide bearing is formed of a bearing part movable along axially in a slide bushing, the moment of rotation depends, in particular, on the dimensions and material properties of this part, so that it varies greatly with the production tolerances. The production of a bearing with a definite and close-tolerance moment of rotation is associated, therefore, with considerable production expense. The moment of rotation is also subject to considerable variations during operation, especially by wear on the sliding surfaces and by different heat expansion of the slide bushing and the bearing part.

U.S. Pat. No. 2,846,251 discloses an elastic rotary bearing of limited angular and radial mobility with bearing surfaces formed on a ring of the stud. In this rotary bearing, there is no intermediate shell, and the rotatability cannot be set independently of the radial and angular mobility.

SUMMARY OF THE INVENTION

Based on this, the invention addresses the problem of providing an improved elastic bearing with resistance to rotation and elasticity of the angular and radial movement of the stud which can be selected independently of each other, which, in particular, is easier to produce and in which the resistance to rotation is subject to only slight variations during operation.

For the technical solution, it is provided, in combination with the features of the first bearing of this kind, that the intermediate shell has a radially outward collar. Two bearing shells are set between the intermediate shell and the joint housing and secured against rotation relative to the joint housing. The two bearing shells are located axially on both sides of the collar and are supported against the latter by frictional surfaces. The bearing shells are pressed in the axial direction of the stud against the collar by a spring element supported against the joint housing.

In this solution according to the invention, the stud is held in the intermediate shell under prestress from the elastomer bushing so that the stud and intermediate shell cannot rotate freely relative to each other. The dimensioning and properties of the elastomer bushing determine, however, the angular and radial movement of the stud. On the other hand, the moment of rotation or resistance to rotation is independent of the elasticity and is determined by the prestress of the spring element which presses the bearing shell in the axial direction of the stud against the collar of the intermediate shell which can rotate with the stud. The spring element also effects, through its prestress, a compensation which is provided for any tendency for moment of rotation variations to occur during operation because the spring element presses the bearing shell with approximately constant force against the collar.

In one embodiment, it is provided that the first bearing shell is pressed into the joint housing and secured against rotation. The spring element lies against the other bearing shell, and the two bearing shells are held in the joint housing and secured against a mutual rotation through an end notching. With this solution, both bearing shells are secured against rotation, while only the second bearing shell is axially movable for the application of the bearing pressure against the collar. Moment of rotation, that is, resistance to rotation, tolerances are further narrowed in this way.

In another embodiment, the intermediate shell has an extension which extends radially inward and which is brought against the stud. The extension suppresses, in many applications, a purely radial movement of the stud. However, the angular and rotational mobility are not influenced.

In a further development, the stud has at its end a riveted disc for support against an end of the intermediate shell and against the joint housing. To obtain the angular and radial mobility of the stud, gaps are formed between the disc and the end of the stud or the joint housing so that the stud, without impairing the function of the bearing, is secured against pushing or pulling from its pressurized seating in the intermediate shell.

For solution of the problem, it is also provided, in combination with the features of the second bearing of this kind, that the stud has a radially outward collar. Two bearing shells are set radially between the stud and the intermediate shell and are secured against rotation relative to the intermediate shell. The two bearing shells are supported axially against each side of the collar with frictional surfaces. The bearing shells are pressed against the collar in the axial direction of the stud by a spring element supported against the joint housing.

In this solution according to the invention, a first intermediate shell is held under prestress by the elastomer bushing in the joint housing so that it cannot rotate freely relative to the joint housing. Moreover, the dimensioning and properties of the elastomer bushing determine the elasticity of the angular and radial movement of the stud because the stud has the same angular and radial movement as the first intermediate shell. The resistance to rotation, on the other hand, is determined by the prestress of the spring element. The spring element prestresses, by means of a second intermediate shell, the collar of the stud between the two intermediate shells. In this solution also, the spring element compensates production tolerances and wear since it provides a relatively constant pressure of the intermediate shells against the collar. Because of its elasticity, the spring element also allows the desired angular and radial movement of the intermediate shells.

In one embodiment of this solution, the end surface of one intermediate shell has an inner cone which forms with the radial housing projection, in longitudinal section, a gap opened toward the axis of the stud to make possible an improved angular mobility of the stud and the intermediate shell.

In a further development, an intermediate shell is made in one piece with one bearing shell, and the other bearing shell is set into an opening of the intermediate shell, which provides an especially space-saving construction.

Moments of rotation of especially close tolerance are obtained when the one bearing shell in one piece with the intermediate shell is supported by an end surface against a radial projection of the joint housing.

The collar of the intermediate shell or the stud may have flat bearing surfaces for the bearing shell or intermediate shell. In this way, however, only support in the axial direction of the stud is obtained, so that the bearing shells must support the intermediate shells or the stud in the radial direction also. With this are associated increased requirements as to production accuracy. But if the collar of the intermediate shell or of the stud has two conical bearing surfaces for the bearing shell or intermediate shell, this suffices for axial and radial support if the bearing shell is supported only against the collar of the stud. This means a considerable reduction of the cost of production because the spring element prestressing the bearing shells or intermediate shells compensates the production tolerances.

According to another embodiment, the spring element may be provided with an O-ring which performs an additional sealing function. Greater moments of rotation are preferably set with a plate spring as the spring element.

The preferred material for the intermediate shells or at least one intermediate shell is a hard or hard elastic plastic. A bearing metal may also be considered. The plastic or bearing metal itself might also be used with at least one bearing shell.

BRIEF DESCRIPTION OF THE DRAWINGS

Other details and advantages of the subject of the invention are described from the description following the respective drawings which show three preferred embodiments of an elastic bearing constructed in accordance with the invention.

DESCRIPTION OF PREFERRED EMBODIMENTS OF THE INVENTION

Figure 1:
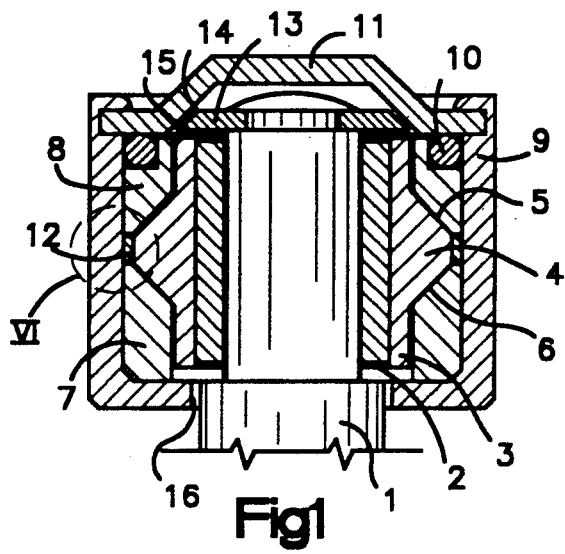
FIG. 1 shows a bearing with an intermediate shell rotatably supported in bearing shells, in longitudinal section.
Figure 2:
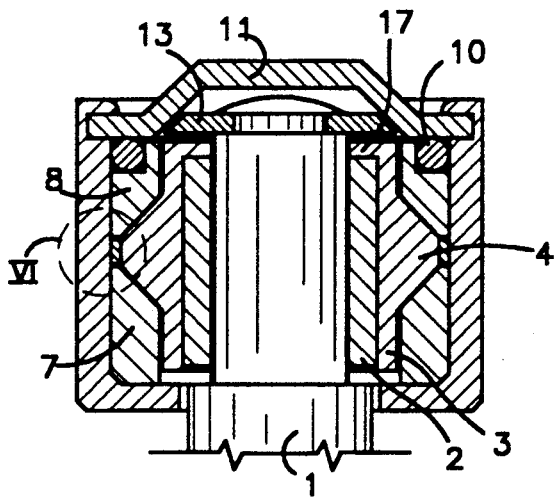
FIG. 2 shows a bearing with an intermediate shell rotatably supported in bearing shells and having a radial extension, in longitudinal section.
Figure 3:
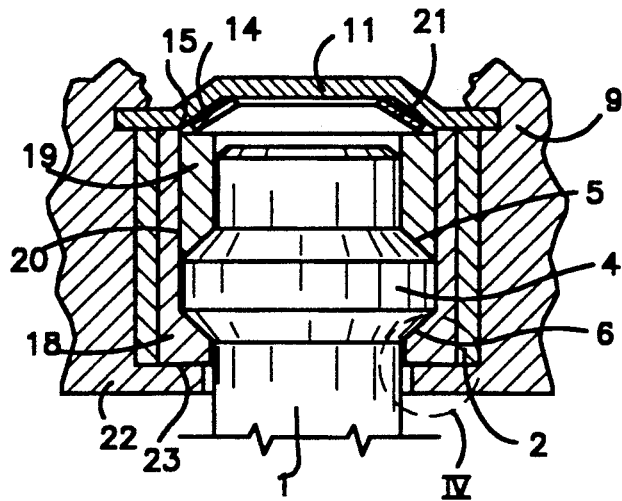
FIG. 3 shows a bearing with a stud rotatably supported in an intermediate shell with an intermediate socket, in longitudinal section.

Elastic bearings shown in FIGS. 1-3 are constructed symmetrical around the axis of a stud so that other section representations need not be explored.

In the bearing according to FIG. 1, the stud 1 is pressed with interposition of a bushing 2 made of elastomer or rubber-elastic material into an intermediate shell 3. The stud 1 is held by the bushing 2, but has limited angular and radial mobility in the intermediate shell 3 because of the elasticity of the bushing.

The intermediate shell 3 has a collar 4 with conical bearing surfaces 5, 6 against which presses a two-part bearing shell having a first bearing shell 7 and a second bearing shell 8. The bearings shells 7, 8 lie, only in the region of the bearing surfaces 5, 6, against the intermediate shell 3 so that the moment of rotation, that is, the resistance to rotation, of the intermediate shell 3 is determined only by the axial prestress of the bearing shell halves 7, 8.

The first bearing shell 7 is pressed in and secured against rotation between the bearing surface 6 and a joint housing 9. The second bearing shell, on the other hand, is axially movable within the joint housing 9 and is pressed by an O-ring 10 against the collar 4. The O-ring 10 is supported against a rolled-in closing cover 11 of the joint housing 9.

Between the two bearing shells 7, 8 is formed an end notching 12 which secures the second bearing shell 8 on the pressed-in first bearing shell 7 against rotation in the joint housing 9.

Figure 6:
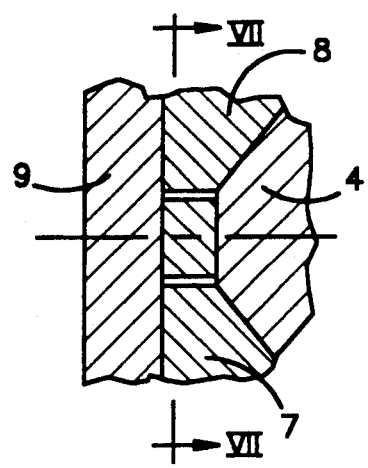
FIG. 6 shows an enlargement of the detail VI in FIGS. 1 and 2.

As shown in FIG. 6, the bearing shell (8) has a ring-shaped addition which is arranged between the ring (4) and the joint housing (9). The bearing shell (7) almost reaches the addition of the bearing shell (8).

Figure 7:
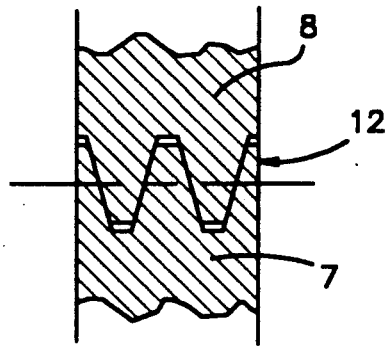
FIG. 7 shows a sectional view taken approximately along line VII—VII in FIG. 6.

As shown in FIG. 7, each of the bearing shells (7, 8) has a row of teeth arranged in the axial direction. These rows of teeth engage with each other so that a movement of the bearing shell (8) relative to the bearing shell (7) is not possible. Since the bearing shell (7) lies against the bottom and against the circumferential surface of the joint housing (9) and is held friction-locked, the bearing shell (8) also cannot move relative to the joint housing (9) or to the intermediate shell (3).

The stud 1 has on its end a riveted disc 13 which prevents the stud 1 from being pushed or pulled out of its pressurized seating. To assure an angular and radial mobility of the stud 1, the rim of the disc 13 is beveled parallel to the side wall of the pot-shaped closing cover 11, a first gap 14 is provided between the rim of the disc 13 and the side wall of the closing cover 11, and a second gap 15 is provided between the underside of the disc 13 and the intermediate shell 3 or the bushing 2. For the same reasons, a third gap 16 is provided between a housing opening and the stud 1.

The collar 4 of the intermediate shell 3, in the embodiment shown, is arranged in the middle in the axial direction of the stud. However, it may also be displaced in the axial direction of the stud, for example, with certain angular movements of the stud 1 to obtain a change of in resistance to rotation.

In a single, change from the elastic bearing shown in FIG. 1, the one represented in FIG. 2 has an extension 17 on the intermediate shell 3.. The extension 17 is directed radially inward up to the stud 1 to prevent radial movement of the stud 1. So that the angular mobility of the stud 1 will remain practically unimpaired, the extent of the extension 17 in the axial direction of the stud is considerably less than the axial extent of the intermediate shell 3. For the rest, the explanations of the bearing in FIG. 1 apply also to that in FIG. 2.

FIG. 3 shows an embodiment with a stud 1 which has a collar 4 with conical bearing surfaces 5, 6. The stud is held against the conical bearing surfaces 5, 6 and is movable in rotation in an intermediate shell consisting of a first intermediate shell 18 and a second intermediate shell 19. To assure moments of rotation of narrow tolerance, the intermediate shells 18, 19 support the stud 1 only at the conical bearing surfaces 5, 6.

The first intermediate shell 18 receives the second intermediate shell 19 in a cylindrical opening 20. The second intermediate shell 19 is supported through a plate spring 21 against the closing cover 11 of the joint housing 9. A first gap 14 between the plate spring 21 and the closing cover 11 makes possible a springing in of the plate spring 21.

The first intermediate shell 18 is pressed with interposition of an elastomer or rubber-elastic bushing 2 into the joint housing 9. The bushing 2 holds the first intermediate shell 18 and is secured against rotation in the joint housing, but makes possible its limited angular and radial mobility. To obtain the limited angular mobility between the first intermediate shell 18 or the second intermediate shell 19 and the closing cover 11, a second gap 15 is formed. For the same reasons, an end surface 23 of the first intermediate shell 18 is designed as an inner cone and is supported against a radial housing projection 22.

Figure 4:
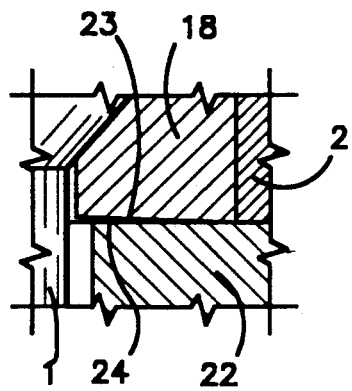
FIG. 4 shows an enlargement of the detail IV in FIG. 3.

As better shown in enlarged detail in FIG. 4, the end surface 23 forms with the housing projection 22, in longitudinal section, a gap 24 opened toward the axis of the stud 1, which facilitates a limited angular movement of the intermediate shells 18, 19 with the stud 1.

Figure 5:
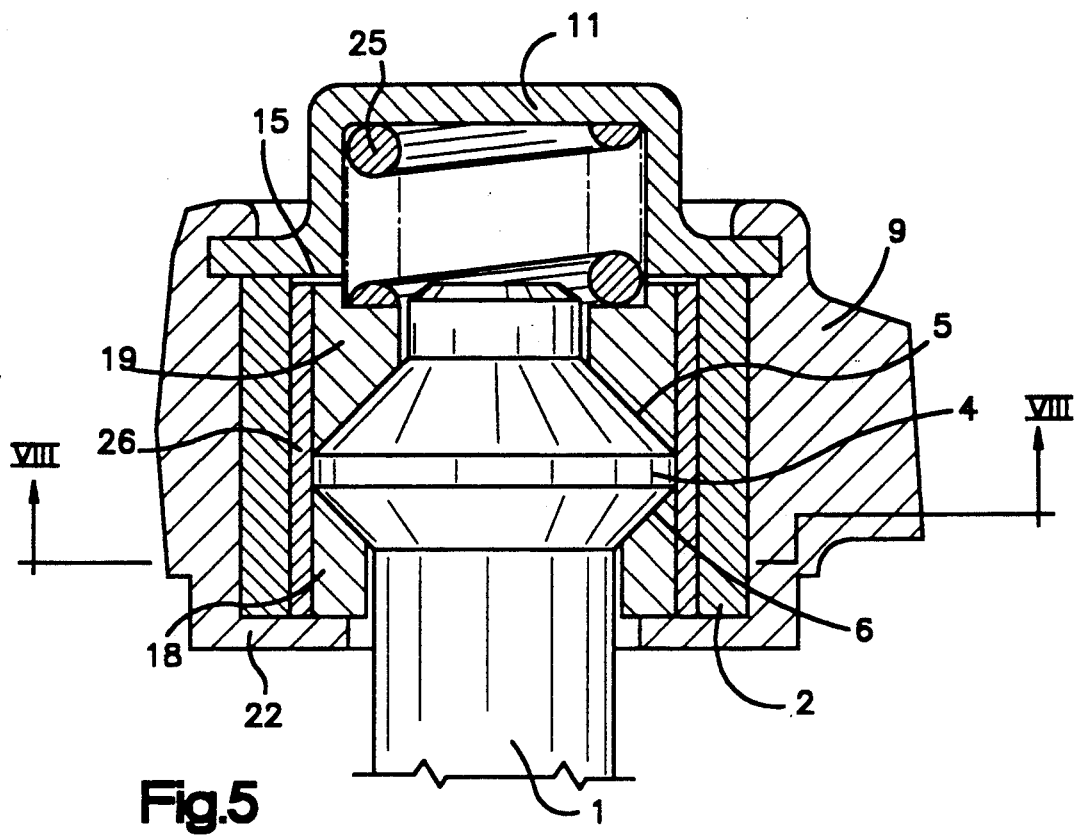
FIG. 5 shows a bearing with a stud rotatably supported in an intermediate shell with an intermediate socket, in longitudinal section.

The bearing represented in FIG. 5 also has a stud 1 which is supported by a collar 4 with conical bearing surfaces 5, 6 against a first intermediate shell 18 and a second intermediate shell 19 and which is movable in rotation. The intermediate shells 18, 19 hold the stud 1 only against the conical bearing surfaces 5, 6.

The first intermediate shell 18 is supported against a housing projection 22 and the second intermediate shell 19 is supported through a coil spring 25 against a rolled-in closing cover 11 of the joint housing 9.

Unlike the bearing according to FIG. 3, however, the second intermediate shell 19 is not received into an opening of the first intermediate shell 18, but rather into a technically equivalent intermediate socket 26 which also receives the first intermediate shell 18. An elastic bushing 2 is pressed in between the intermediate socket 26 and the joint housing 9, and makes possible a limited angular movement of the intermediate socket 26 with the intermediate shells 18, 19 and the stud 1 in the joint housing 9. Here, the bushing 2 holds the intermediate socket 26 secure against rotation in the joint housing 9 so that the moment of rotation of the stud 1 depends only on the material joining the stud 1 and the intermediate shells 18, 19 and the prestress of the coil spring 25, provided the intermediate shells 18, 19 are held secure against rotation in the intermediate socket 26.

Figure 8:
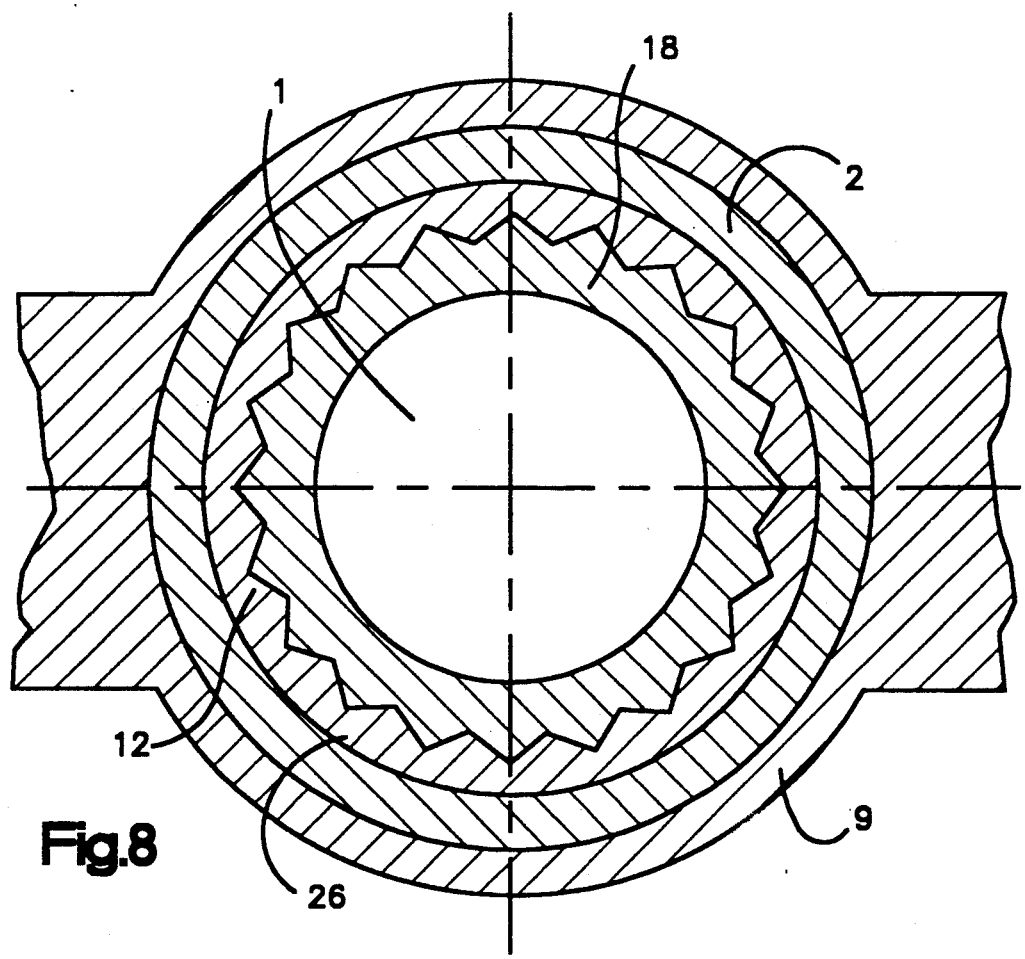
FIG. 8 shows a sectional view taken approximately along line VIII—VIII in FIG. 5.

As shown in FIG. 8, the end notching (12) is arranged between the intermediate shell (19) and the intermediate socket (26). The end notching (12) has toothed flanks extending in the axial direction parallel to the stud (1). In the embodiment shown in FIG. 8 also, movement of the intermediate shell (19) relative to the intermediate socket (26) is not possible.

To assure a limited angular and axial movement of the stud 1, a gap 15 is formed between the intermediate socket 26 or the second intermediate shell 19 and the closing cover 11.

Also, in the joint according to FIG. 5, the first intermediate shell 18 and the intermediate socket 26 may form with the housing projection 22, in longitudinal section, a gap open toward the stud axis, which facilitates a limited angular movement of the stud 1.

In particular, hard or hard elastic materials, which may have an increased frictional coefficient with the materials of the adjoining bushing 2 and the adjoining intermediate shells 18, 19, may be considered as material for the intermediate socket 26.

Having described specific preferred embodiments of the invention, the following is claimed:

1. An elastic bearing for steering rods of motor vehicles with a rotatable stud (1) having limited angular and radial mobility, the stud (1) being pressed with the interposition of an elastomer bushing (2) into an intermediate shell (3), and the intermediate shell (3) being rotatably supported in a joint housing (9), with the distinction that the intermediate shell (3) has a radially outward collar (4), that two bearing shells (7, 8) are set in between the intermediate shell (3) and the joint housing (9) and are supported axially against both sides of the collar by frictional surfaces on the latter and are secured against rotation relative to the joint housing, and that the two bearing shells (7, 8) are pressed against the collar (4) by a spring element (10) supported against the joint housing (9).

2. An elastic bearing according to claim 1, with the distinction that one bearing shell (7) is pressed into the joint housing (9) and is secured against rotation, that the spring element (10) lies against the other bearing shell (8), and that the two bearing shells (7, 8) are held by an end notching and are secured against rotation relative to each other.

3. An elastic bearing according to claim 2, with the distinction that the stud (1) has on its end a riveted disc (13) for support against an end of the intermediate shell (3) and against the joint housing (9), and that gaps (14, 15) are formed between the disc (13) and the end of the stud (1) and the joint housing (9), respectively, to obtain the angular and radial mobility of the stud (1).

4. An elastic bearing for steering rods of motor vehicles with a rotatable stud (1) having limited angular and radial mobility, the stud (1) being supported rotatable in an intermediate shell (26), and the intermediate shell (26) being pressed with interposition of an elastomer bushing (2) into a joint housing (9), with the distinction that the stud (1) has a radially outward collar (4), that bearing shells (18, 19) secure against rotation relative to the intermediate shell (26) are set in radially between the stud (1) and the intermediate shell (26) and axially on both sides of the collar (4), the bearing shells (18, 19) being supported on the collar (4) by frictional surfaces, and that the bearing shells (18, 19) are pressed by a spring element (25) supported against the joint housing (9) in the axial direction of the stud against the collar (4).

5. An elastic bearing according to claim 4, with the distinction that the intermediate shell is made in one piece with one bearing shell (18), and that the other bearing shell (19) is set into an opening (20) of the one bearing shell (18).

6. An elastic bearing according to claim 5, with the distinction that the bearing shell (18) is made in one piece with the intermediate shell and is supported by an end surface (23) against a radial projection (22) of the joint housing.

7. An elastic bearing according to claim 6, with the distinction that the end surface (23) of the one bearing shell (18) has an inner cone which forms with the radial housing projection (22), in longitudinal section, a gap (24) opened toward the axis of the stud.

8. An elastic bearing according to one of claim 4, with the distinction that the two bearing shells (18, 19) are held secure against mutual rotation by means of a notching.

9. An elastic bearing according to one of claim 1, with the distinction that the collar (4) of the intermediate shell (3) or of the stud (1) has two conical support surfaces (5, 6) for the bearing shells (7, 8; 18, 19).

10. An elastic bearing according to one of claim 1, with the distinction that an O-ring is provided as the spring element.

11. An elastic bearing according to one of claim 1, with the distinction that a plate spring (21) is provided as the spring element.

12. An elastic bearing according to one of claim 1, with the distinction that the intermediate shell (3) or at least one bearing shell (7, 8; 18, 19) consists of a hard or hard elastic plastic.

13. An elastic bearing according to one of claim 1, with the distinction that the intermediate shell (3) or at least one bearing shell (18, 19) consists of a bearing metal.

* * * * *

UNITED STATES PATENT AND TRADEMARK OFFICE
CERTIFICATE OF CORRECTION

PATENT NO. : 5,028,163

DATED : July 2, 1991

INVENTOR(S) : Michael Krieg and Fritz Busse

It is certified that error appears in the above-identified patent and that said Letters Patent is hereby corrected as shown below:

Column 8, Line 3, Claim 8, delete "one of".

Column 8, Line 7, Claim 9, delete "one of".

Column 8, Line 11, Claim 10, delete "one of".

Column 8, Line 14, Claim 11, delete "one of".

Column 8, Line 17, Claim 12, delete "one of".

Column 8, Line 21, Claim 13, delete "one of".

Signed and Sealed this

Seventeenth Day of November, 1992

Attest:

DOUGLAS B. COMER

*Attesting Officer*      *Acting Commissioner of Patents and Trademarks*